(12) United States Patent
Ketcham

(10) Patent No.: US 6,195,589 B1
(45) Date of Patent: Feb. 27, 2001

(54) PERSONAL DATA ASSISTANT WITH REMOTE CONTROL CAPABILITIES

(75) Inventor: Carl Ketcham, Taylorsville, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/036,850

(22) Filed: Mar. 9, 1998

(51) Int. Cl.[7] .................................................. G05B 13/02
(52) U.S. Cl. .................................................. 700/28; 700/1
(58) Field of Search ................................ 700/28, 1, 6, 17, 700/40, 83; 706/11

(56) References Cited

U.S. PATENT DOCUMENTS

| | | | |
|---|---|---|---|
| 5,537,463 | * | 7/1996 | Escobosa et al. ............... 379/102.01 |
| 5,895,906 | * | 4/1999 | Danielson et al. ............... 235/462.27 |
| 6,008,735 | * | 12/1999 | Chiloyan et al. ............... 340/825.22 |
| 6,014,705 | * | 1/2000 | Koenck et al. ....................... 709/230 |

FOREIGN PATENT DOCUMENTS

WO 94/22242 * 9/1994 (WO) .............................. H04B/10/10

* cited by examiner

Primary Examiner—Robert W. Beausoliel, Jr.
Assistant Examiner—Rita Ziemer
(74) Attorney, Agent, or Firm—Workman, Nydegger & Seeley

(57) ABSTRACT

An adapter having a housing is configured for removable attachment to a conventional PDA. The adapter is electrically coupled with the PDA and includes a light source configured to selectively emanate a light beam that can be modified into a digital signal. The digital signal can be received by a photo detector on computer for facilitating a download of data from the PDA to the computer. Software loaded in the memory of the PDA corresponds to predetermined remote-controllable devices. By inputting to the PDA the desired remote-controllable device and desired function, the light source emits a pulse signal that signals the remote-controllable devices to perform the desired function.

4 Claims, 5 Drawing Sheets

PERSONAL DATA ASSISTANT WITH REMOTE CONTROL CAPABILITIES

BACKGROUND OF THE INVENTION

1. The Field of the Invention

The present invention relates to personal data assistants (PDAs) and, more specifically, PDAs or adapters therefor capable of operating remote-controllable devices.

2. Present State of the Art

In our rapidly advancing electronic era, consumers are obtaining increasing numbers of remote-controllable devices such as stereos, televisions, and VCRs. Each of theses separate devices comes with its own remote control. Unfortunately, remote controls are often difficult to operate and are frequently lost. These problems are compounded by the fact that consumers must locate and learn to operate a number of remote controls that usually have different configurations and operating instructions.

Another electronic apparatus that is increasing in popularity is the personal data assistant (hereinafter "PDA"). PDAs are small, substantially hand-sized computers that are used for storing, manipulating, and retrieving a defined amount of data. One example of a PDA is the PalmPilot® manufactured by 3Com. The PalmPilot® functions primarily as an electronic day planner and address recorder. Although PDAs are useful, they provide another electronic device that the consumer must learn to master.

OBJECTS AND BRIEF SUMMARY OF THE INVENTION

Accordingly, it is an object of the present invention to provide PDAs and/or adapters for PDAs that can operate remote-controllable devices.

Another object of the present invention is to provide PDAs and/or adapters for PDAs that can operate a plurality of remote-controllable devices.

Finally, it is an object of the present invention to provide PDAs and/or adapters for PDAs that can consolidate or limit the number of remote controls to operate a variety of different remote-controllable devices.

To achieve the foregoing objectives, and in accordance with the invention as embodied and broadly described herein, an adapter for a PDA is provided. The adapter has a substantially L-shaped housing that can be physically and electrically coupled with a conventional PDA. Disposed within the housing of the adapter is a micro processor and a light source which are energized by enclosed batteries. In one embodiment, the light source is a laser. In another embodiment, the light source is a light emitting diode.

The light source emits a light beam which can be converted into a digital signal. This can be accomplished by using a switch which turns the light source on and off. Alternatively, a liquid crystal display (LCD) can be positioned in front of the light source which can then be selectively turned on and off to block the light beam.

When it is desired to download the data stored on the PDA, the micro processor in the adapter transmits a corresponding series of digital pulses using the light source. These pulses are received by a photo detector of a host computer. The photo detector is coupled with a processor which receives, processes, and stores the data stream. The adapter can thus be used to download information from the PDA to a host computer without effecting a physical electrical connection therebetween.

The adapter can also be used to operate remote-controllable devices such as stereos, televisions, and VCRs. By loading appropriate software in the PDA or adapter, the light source can be operated by the microprocessor to emit low speed pulses to a remote-controllable device for remotely controlling the device. For example, by accessing software on the PDA for a television, depressing a select control button on either the PDA or the adapter generates a low speed pulse that turns the television on or off. Of course other functions such as volume or channels can also be selectively changed. Likewise, by selecting other programs loaded on the PDA, a single PDA can be used to remotely operate a variety of different remote-controllable devices.

Accordingly, by using a single PDA, a variety of different remote-controllable device can be operated. As a result, the consumer does not need to purchase separate remote control devices and need only learn how to operate a single device in order to know how to operate a variety of different remote-controllable devices.

In other embodiment, the electronics of the adapter can be integrally formed within the PDA so that it performs the above functions. In this embodiment, the separate adapter is not required.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
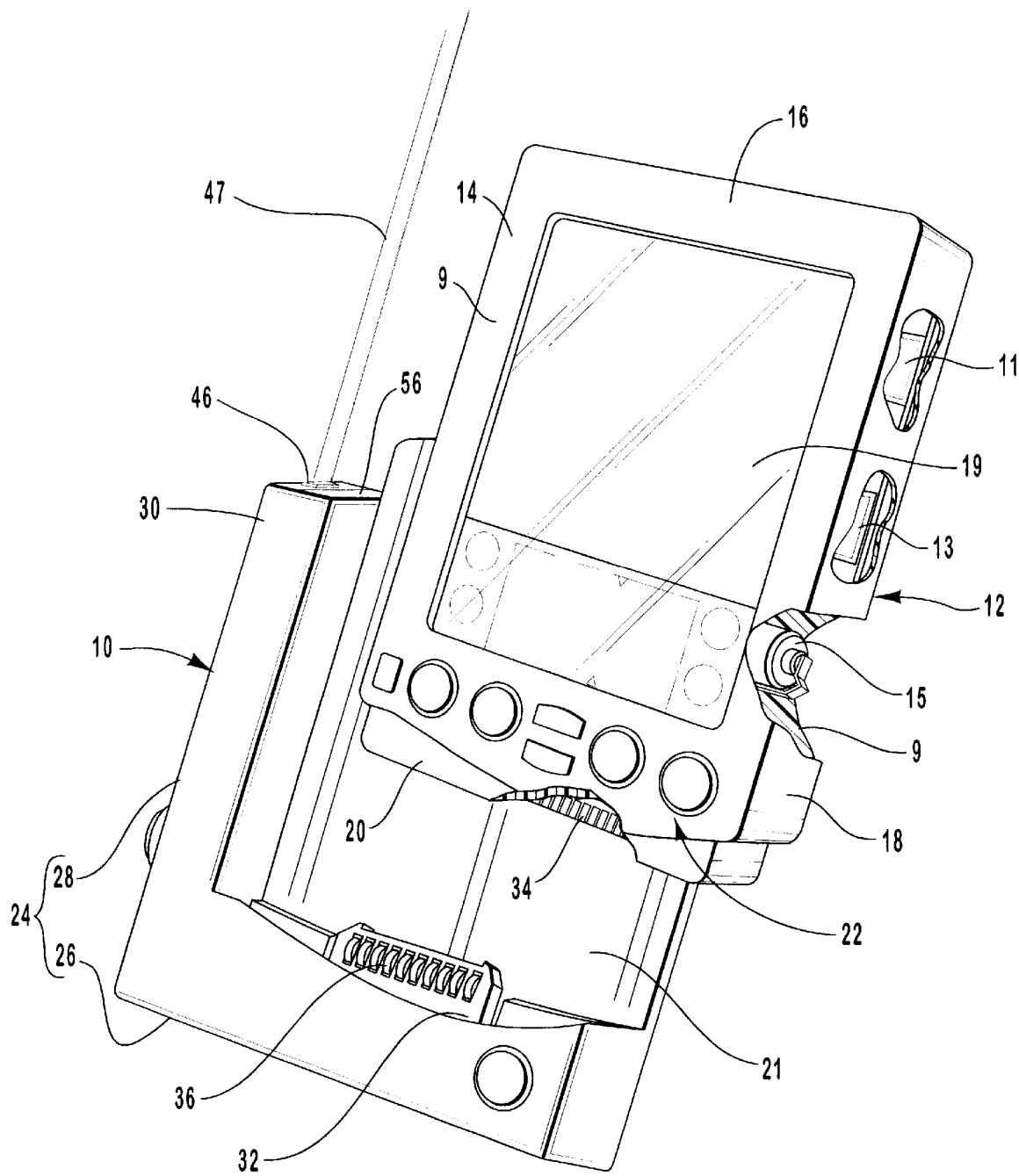
FIG. 1 is a front perspective view of a PDA separated from an adapter.

Depicted in FIG. 1 is one embodiment of an inventive adapter 10 for use with a conventional PDA 12. PDAs come in a variety of makes, styles, and configurations. In one embodiment of the present invention, PDA 12 includes a PalmPilot® made by 3Com. PDA 12 includes a low profile box shaped housing 9 having a front face 14 extending from a top end 16 to a bottom end 18. Mounted on front face 14 is a display screen 19. Positioned at bottom end 18 are control buttons 22. Disposed within housing 9 is a micro processor 11 coupled with memory 13 such as RAM, and batteries 15 for powering the system. The microprocessor interacts with an operating system that runs selective software depending on the intended use of PDA 12. In one conventional use, memory 13 is loaded with software code for operating an electronic day planner and address notebook.

Adapter 10 has a substantially L-shaped housing 24 which comprises a base 26 and an arm 28. Arm 28 extends to a free end 30. In one embodiment, a support back 21 extends between base 26 and arm 28. The present invention also includes means for removably coupling adapter 10 to PDA 12. By way of example and not limitation, bottom end 18 of PDA 12 includes a tapered section 20. Recessed within base 26 is a complimentary socket 32. Socket 32 is configured to receive tapered section 20 so as to removably secure PDA 12 to adapter 10. Of course, there are a variety of alternative configurations which can be used for helping to secure PDA 12 within socket 32. For example, spring biased members or interlocking ridges can be used for further facilitating the connection. In yet other alternative embodiments, there are a variety of different latches, straps, and connectors that can be used for securely holding PDA 12 to adapter 10.

Means are also provided for effecting electrical communication between PDA 12 and adapter 10. By way of example and not limitation, a first interface connector 34 is mounted to bottom 18 of PDA 12. First interface connector 34 is electrically coupled with the circuitry within PDA 12. Disposed within socket 32 of adapter 10 is a second interface connector 36. Interface connectors 34 and 36 are configured to electrically couple together when PDA 12 is coupled to adapter 10. Interface connectors 34 and 36 permit the transfer of electronic data between PDA 12 and housing 10. In one embodiment, interface connectors 34 and 36 comprise an RS232 connection.

Figure 2:
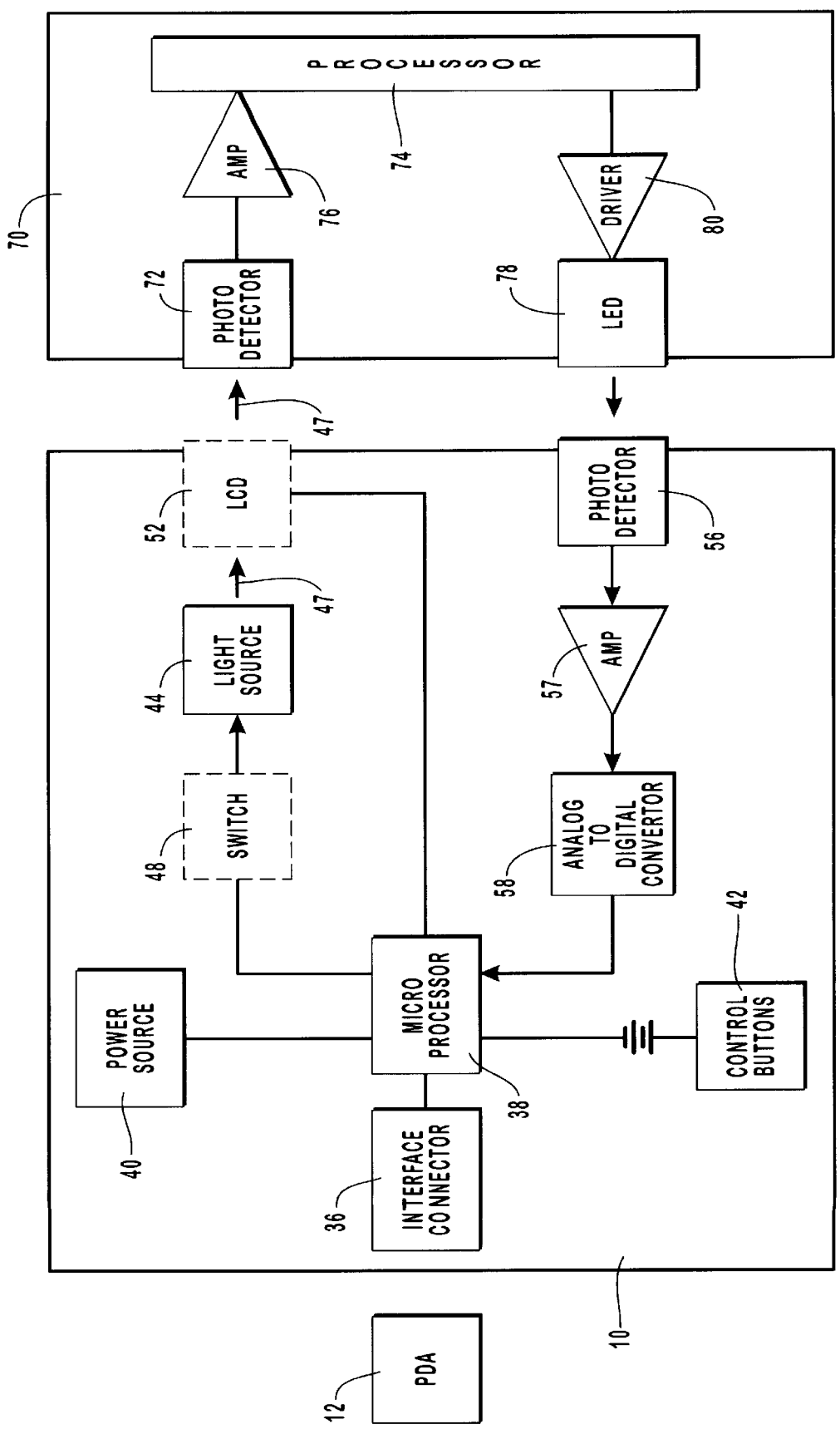
FIG. 2 is a block diagram of the components of the adapter shown in FIG. 1 and components of a computer.

FIG. 2 in part depicts a functional block diagram of the electrical system of adapter 10. As depicted therein, interface connector 36 is electrically coupled with a micro processor 38. Micro processor 38 and the other electrical components are driven by a power source 40. In one embodiment, power source 40 can comprise the same type of battery system as used in a conventional PDA. Micro processor 38 is selectively operated by a series of control buttons 42. Control buttons 42 can be positioned on adapter 10 and/or on PDA 12. In an alternative embodiment, micro processor 38 can be eliminated. In this embodiment, the processing functions would be handled by micro processor 11 within PDA 12.

In one embodiment, a light source 44 is electrically coupled with micro processor 38. In other embodiments, light source 44 can be directly coupled with power source 40. As depicted in FIG. 1, light source 44 is preferably positioned within arm 28 so as to emit a light beam 47 out through a window 46 at free end 30.

Light source 44 can have a variety of configurations. For example, in one embodiment light source 44 can be a simple light emitting diode such as an infrared emitter. In another embodiment, light source 44 can comprise a laser. In one embodiment, the laser can comprise a red light emitting laser wherein the light is sufficiently collimated that the laser can be used as a conventional laser display pointer for use in lectures or presentations.

Figure 3:
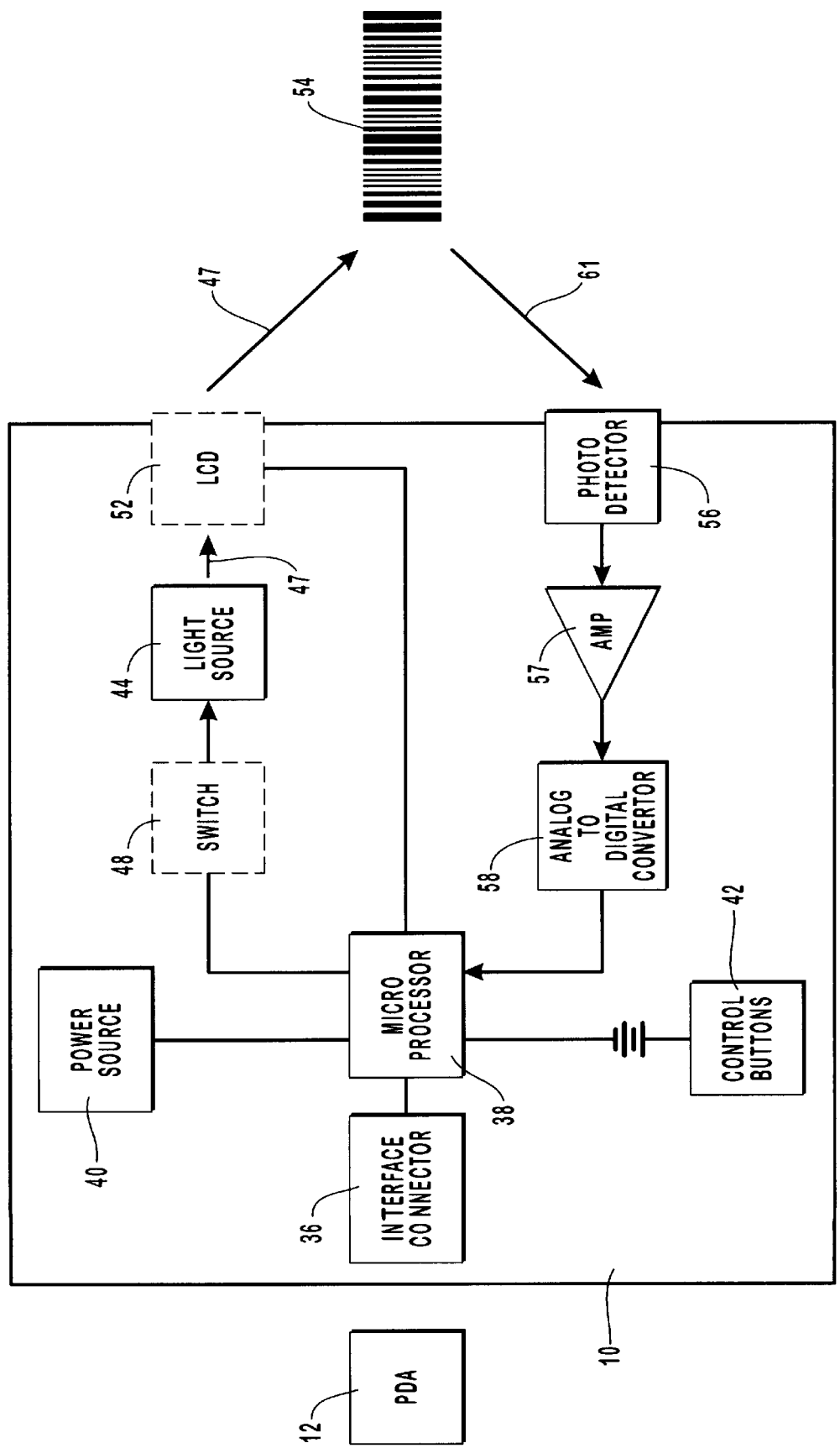
FIG. 3 is a block diagram of the adapter shown in FIG. 1 interacting with a bar code.

Also depicted in FIG. 3 is a simple block diagram of a host computer 70 such as a personal computer or a network computer. Computer 70 includes a photo detector 72 coupled to a processor 74 through an amplifier 76. A light emitting diode 78 is also electrically coupled to processor 74 and is operated by a driver 80.

Where light source 44 is used for downloading information from PDA 12 to host computer 70, means are also provided for converting light beam 47 into a digital signal. This can be accomplished in a variety of different ways. As depicted in FIG. 3, by way of example and not limitation, a switch 48 can be positioned between micro processor 38 and light source 44. Micro processor 38 operates switch 48 to turn light source 44 off and on at select high frequency intervals such that light beam 47 emitted from light source 44 is converted into a digital signal. The digital signal is transmitted to photo detector 72 of computer 70 and subsequently decoded by processor 74. Where light source 44 is a laser, the above configuration can be used to download data from PDA 12 to host computer 70 over an extended distance. In one embodiment, light source can be used to download data to host computer 70 over a distance greater than about two feet, preferably greater than about five feet, and more preferably greater than about ten feet.

The transfer is accomplished by aiming light beam 47 at photo detector 72 and then pressing a select control button 42 that instructs micro processor 38 to transfer the stored data in PDA 12 in digital format using light beam 47. Where light source 44 is simply a light emitting diode, or other non-collimated light source, adapter 10 and PDA 12 may have to be set down close to photo detector 72 and aligned therewith before attempting to transfer the data. In either event, data is quickly and effectively downloaded from PDA 12 to computer 70 without the required use of a cradle or other physical electrical connection.

In yet another alternative embodiment for converting light beam 47 from light source 44 into a digital signal, rather than using switch 48, a liquid crystal display (LCD) 52 is positioned within adapter 10 in the path of light beam 47. LCD 52 is controlled to turn on and off by micro processor 38. When LCD 52 is on, LCD 52 blocks light beam 47 from emanating from adapter 10. Conversely, when LCD 52 is off, light beam 47 freely emanates from adapter 10. Accordingly, by micro processor 38 turning LCD 52 on and off at select high frequencies, light beam 47 is converted into digital signals for being received by photo detector 72.

If desired, comparable technology can also be used to upload data from computer 70 to PDA 12. By way of example, adapter 10 can include a photo detector 56 that is coupled with micro processor 38 through an amplifier 57. Digital signals transmitted by LED 78 are received by photo detector 56 and subsequently decoded by micro processor 38 or are transferred to PDA 12 for decoding.

Adapter 10 can also be configured for reading a bar code 54. For example, as depicted in FIGS. 1 and 3, photo detector 56 is positioned at free end 30 of arm 28 adjacent to window 46. Photo detector 56 is electrically coupled to an analog to digital converter 58 which is coupled with micro controller 38 through amplifier 57. Light source 44 and photo detector 56 are selectively positioned such that as light beam 47 is manually scanned across bar code 54, a portion 61 of light beam 47 is reflected off of the reflective sections of bar code 54 and is received by photo detector 56. Portion 61 of light beam 47 detected by photo detector 56 is in an analog signal which is converted to a digital signal by converter 58. The signal is then transferred to microprocessor 38 for decoding and subsequently sent to PDA 12. In this embodiment, light source 44 emits a thin highly collimated light beam 47 such as those used in conventional scanners.

By using the above configuration, bar codes can be quickly entered into PDA 12 without having to manually input the information. Depending on the intended use and operational software, PDA 12 can either simply store the bar code reading or can be used to access other information based on the bar code reading. By using adapter 10, PDA 12 can be used for inventory control or in other situations where bar codes can be used.

Figure 4:
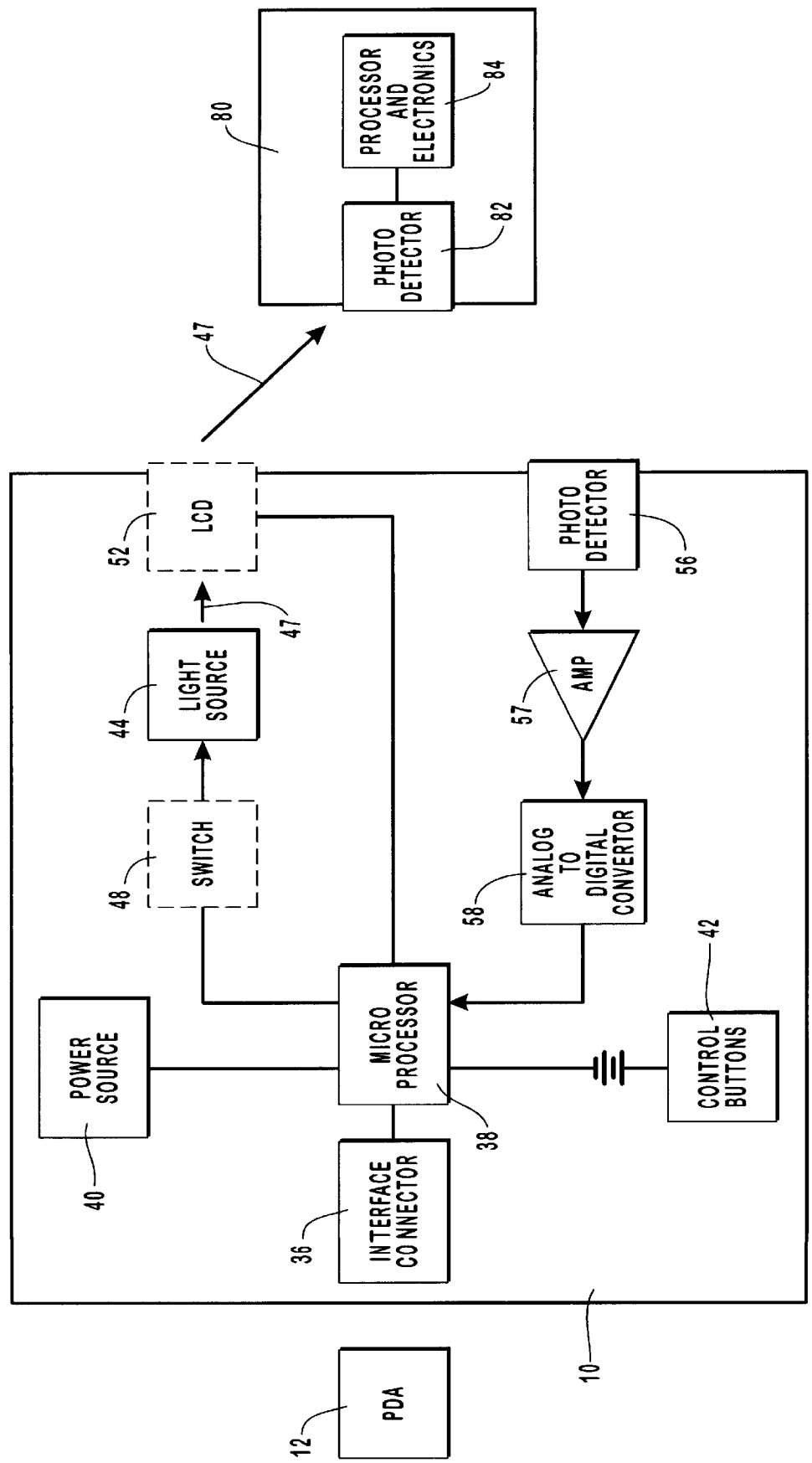
FIG. 4 is a block diagram of the adapter shown in FIG. 1 interacting with a remote-controllable device.

Adapter 10 can also interact with PDA 12 to facilitate operation of a remote-controllable device such as a television, VCR, or stereo. As depicted in FIG. 4, a remote-controllable device 80 is depicted as comprising a photo detector 82 which is electrically coupled with a processor 84 and device electronics. By loading appropriate software in PDA 12, light source 44 can be operated by microprocessor 38 to emit low speed pulses to remote-controllable device 80 for remotely controlling the device.

In one embodiment it is envisioned that software code corresponding to a plurality of different remote-controllable device 80 is loaded in memory 13 of PDA 12. Display screen 19 can be used to access a list of available remote-controllable device. By choosing a select remote-controllable device from the list, processor 11 can operate the corresponding software to assign control buttons to perform specific functions relative to operation of the select remote-controllable device. Alternatively, a list of functional operations can be listed on display screen 19. By selecting a desired function, processor 11 or 38 operates light source 44 to emit a desired light pulse that when received by the select remote-controllable device signals the device to perform the desired function. For example, by accessing software on the PDA for a television, depressing a select control button 42 on either PDA 12 or adapter 10 generates a low speed pulse that turns the television on or off. Of course other functions such as volume or channels can also be selectively changed. Performing functions such as downloading data stored in memory 13 of PDA 12 can be executed using similar steps.

It is noted that the operation of adapter 10 for downloading information to computer 70 is different than operation of adapter 10 for remote control of a device. This is because the bit rates are substantially different for the different uses. From a practical standpoint, downloading information from PDA 12 to computer 70 requires a bit rate of about 20 kbps or higher. In contrast, operation of a remote-controllable device requires a bit rate of about 10 bps.

Figure 5:
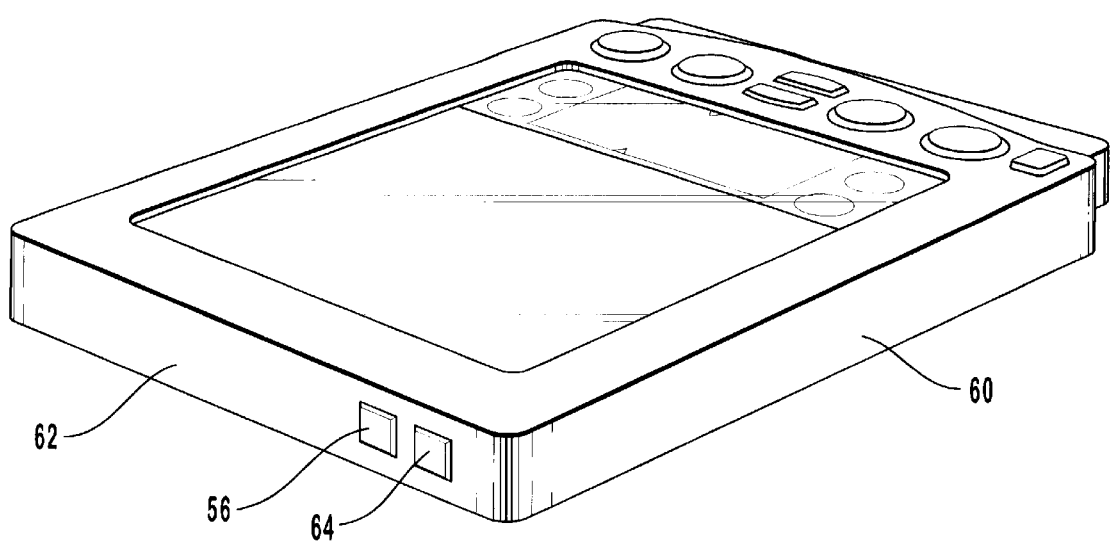
FIG. 5 is a perspective view of a PDA incorporating the electronics of the adapter shown in the FIG. 1.

As depicted in FIG. 5, the present invention also envisions that the electronic circuitry of adapter 10, as depicted and discussed with regard to FIGS. 1–5, can be integrally incorporated into a single PDA 60. For example, PDA 60 is depicted having a top end 62. Formed at top end 62 is a window 64 through which a light beam from a light source within PDA 60 can emanate. Adjacently positioned to window 64 is photo detector 56. Of course, circuitry which is already found in a conventional PDA, such as a micro processor and a power system, need not be redundantly transferred from adapter 10 into PDA 60.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. An adapter removably attached to a PDA for operating a remote-controllable device, the adapter comprising:
    (a) an interface connector configured to removably electrically couple with the PDA,
    (b) a micro controller electrically coupled with the interface connector;
    (c) a light source configured to emit a light beam; and
    (d) means for converting the light beam from the light source into a digital signal, the digital signal being selectively transmitted to operate the remote-controllable device, wherein the means for converting the light beam comprises an LCD positioned in the path of the light beam, the LCD being operable between an on position which blocks the light beam and an off position which allows the light to pass therethrough.

2. An adapter as recited in claim 4, wherein light source is a light emitting diode (LED).

3. An adapter as recited in claim 4, wherein the means for converting the light beam comprises switching circuitry for turning the light source on and off.

4. An adapter as recited in claim 4, wherein the digital signal corresponds to data stored within the PDA.

* * * * *